Dec. 10, 1968  F. C. HOLMES ET AL  3,415,117
SPRING TESTER
Filed May 4, 1966  4 Sheets-Sheet 1
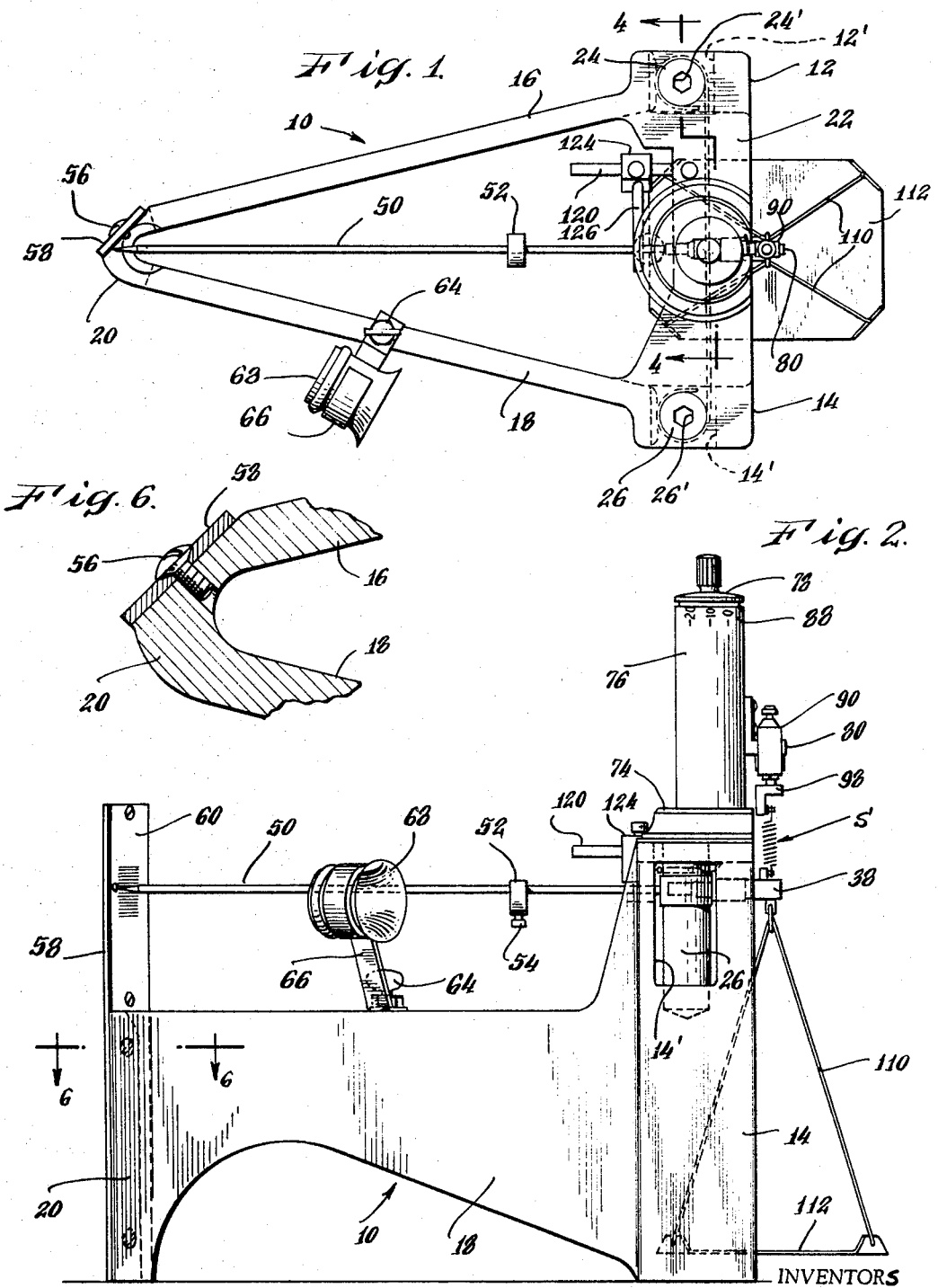
INVENTORS
Frank C. Holmes
Murray S. Clay
BY
Wooster, Davis & Cifelli
ATTORNEYS.

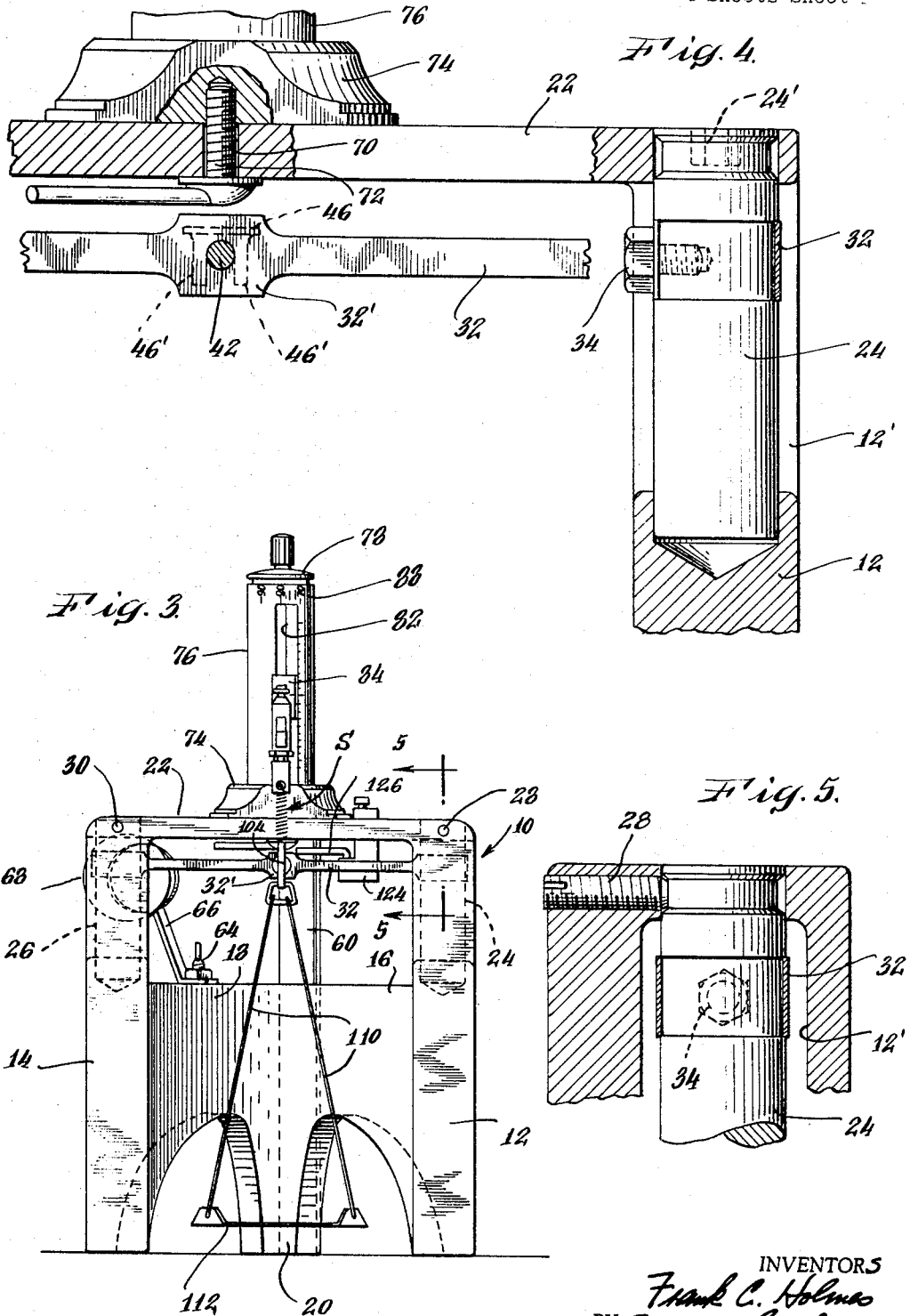

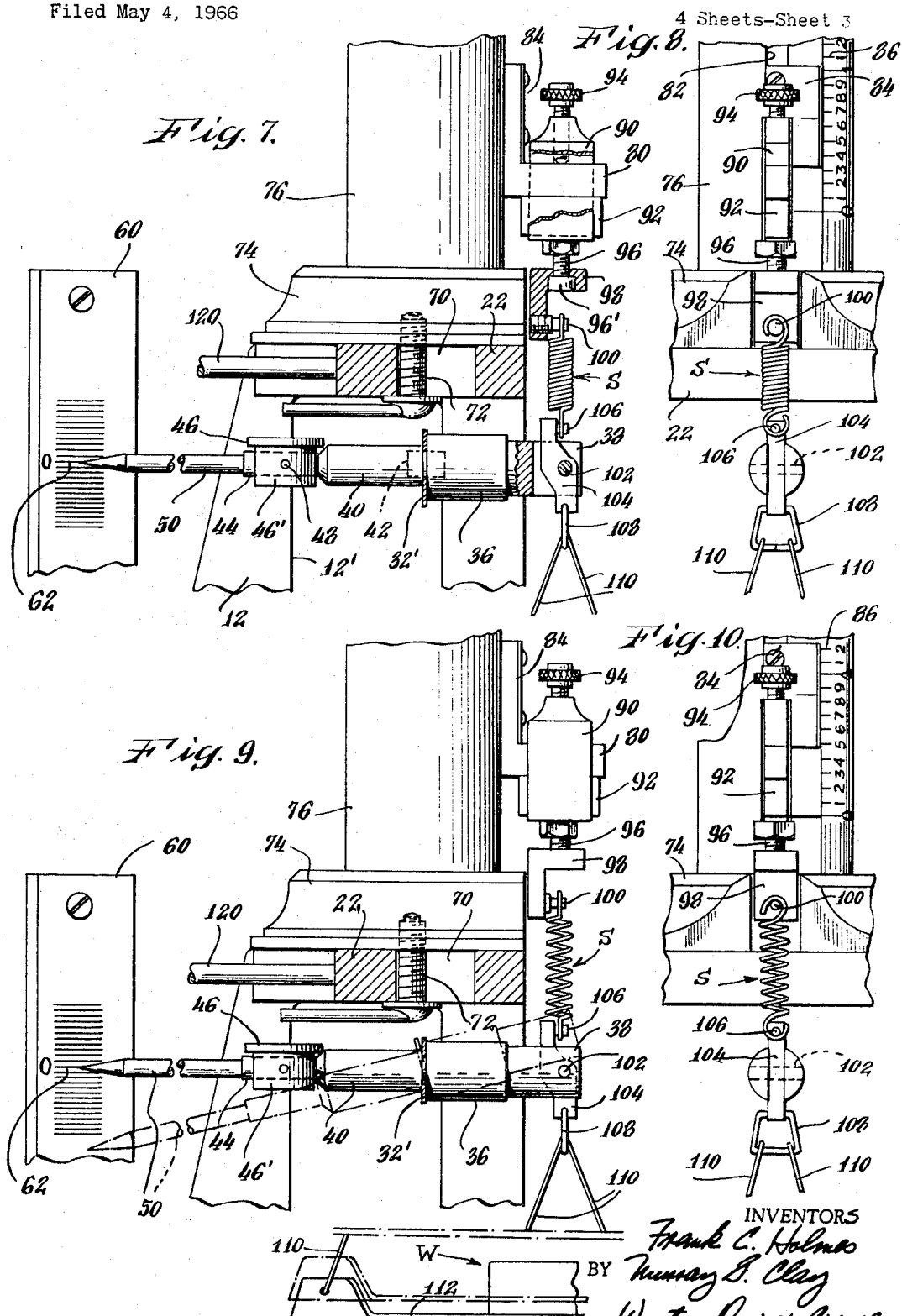

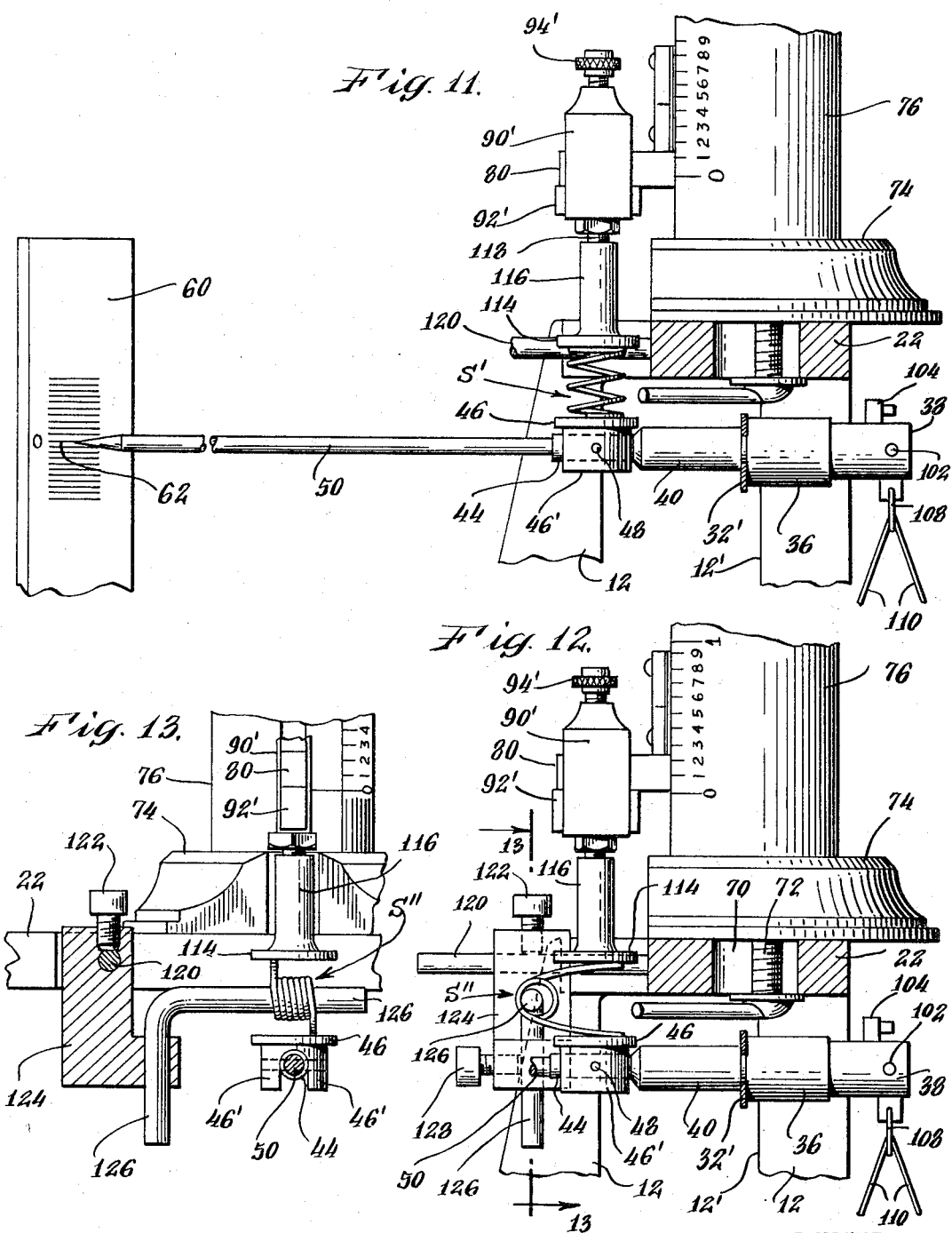

United States Patent Office 3,415,117
Patented Dec. 10, 1968

3,415,117
SPRING TESTER
Frank C. Holmes, Trumbull, Conn., and Murray G. Clay, Evanston, Ill., assignors to The U.S. Baird Corporation, Stratford, Conn., a corporation of Connecticut
Filed May 4, 1966, Ser. No. 547,642
3 Claims. (Cl. 73—161)

ABSTRACT OF THE DISCLOSURE

A device for testing both tension and compression springs. An elongated balance arm is supported on a flat torsion spring which serves as a pivot. One end of the balance arm terminates in a pointer adjacent a fixed scale. The balance arm carries an anvil on one side of the pivot point and a spring engaging stud on the other side. A vertically mounted gauge is positioned above the balance arm and carries a vertically movable spring-engaging element which may be either a second anvil or a second stud. The gauge is reversibly positionable so that a spring may be stressed in either compression or tension. A weight tray is suspended from the balance arm to provide the stressing force.

---

This invention relates to a spring tester and, more particularly, to such a tester for measuring the length of a spring in both its unstressed and stressed conditions.

It is customary to rate springs by their lengths as measured both in an unstressed condition and in a stressed condition under a predetermined load. This testing has been accomplished in the prior art by means of a scale-like balance employing knife edges to support the balance arm and having stops positionable at a plurality of predetermined distances from one another for supporting the spring therebetween. This has had the effect of making it impossible to test a spring except at predetermined lengths. In addition, the use of knife edges introduced undesirable friction which reduced the sensitivity. Also, the knife edges were subject to wear, causing a decrease in accuracy and reproducibility.

Accordingly, it is a primary object of the present invention to provide an improved spring tester. Other objects are to provide such a tester which employs no knife edges; wherein the spring length may be adjusted to any value within the range of the testers; wherein a micrometer is employed as one element of the tester to provide a direct reading of spring length under various conditions of stress; and wherein springs of various types, including both tension and compression springs, may be tested by the same tester.

The manner in which the foregoing objects are achieved will be more apparent from the following description, the appended claims and the figures of the attached drawings wherein:

FIG. 1 is a plan view of a spring tester in accordance with this invention;

FIG. 2 is a side elevational view of the tester of FIG. 1;

FIG. 3 is a right end elevation of the tester of FIGS. 1 and 2;

FIG. 4 is an enlarged cross-section taken substantially along the line 4—4 of FIG. 1;

FIG. 5 is an enlarged cross-section taken substantially along the line 5—5 of FIG. 3;

FIG. 6 is an enlarged cross-section taken substantially along the line 6—6 of FIG. 2;

FIG. 7 is a side view of a portion of the tester showing a tension spring in position for testing;

FIG. 8 is a right end view of that portion of the tester shown in FIG. 7;

FIG. 9 is a view similar to FIG. 7 illustrating the operation of the tester;

FIG. 10 is a right end view of that portion of the tester shown in FIG. 9;

FIG. 11 is a view similar to FIG. 7 but illustrating the modifications made to test a coil spring of the compression type;

FIG. 12 is a view similar to FIG. 11 showing a type of torsion spring in position for testing; and FIG. 13 is a left end view of that portion of the spring tester shown in FIG. 12.

The objects of the present invention are achieved by means of a spring tester which comprises a base member and pivot means supported on the base member. A balance arm is supported by the pivot means in a substantially stable position and indicating means are arranged to indicate deviations of the balance arm from its stable position. An adjustable gauge is also mounted on the base member and includes a first spring-stressing element which is mounted for movement with the gauge. A second spring-stressing element is mounted on the balance arm. Means are also provided for weighting the balance arm so as to stress a spring which is mounted between the first and second spring-stressing elements.

With particular reference to FIGS. 1–3 of the drawings, there is illustrated a spring tester in accordance with the present invention which includes a cast aluminum base member 10 which is substantially triangular in plan view as shown in FIG. 1. The base member includes a pair of spaced legs 12, 14 at the ends of angled side plates 16, 18 which converge to form a single leg 20 at the opposite end. The legs 12, 14 are joined by an integrally cast bridge member 22 which connects their upper ends. Each of the legs 12, 14 is formed with a corresponding window 12', 14', the windows being aligned with one another. In addition, each leg is drilled vertically downward through the bridge member 22 and through each of the windows so as to retain a post 24, 26 in each window. The top of each post is provided with a socket 24', 26' for receiving an Allen wrench. In addition, each post is grooved at its upper end to receive the end of a set screw 28, 30 (FIGS. 3 and 5) mounted in a tapped opening extending from the front of the base member 10.

Stretched across the opening framed by legs 12, 14 is a flat torsion spring 32. Each end of the torsion spring fits within a peripheral groove formed in a corresponding post 24, 26 and is wrapped partially around the post and secured by means of a screw 34. That portion of torsion spring 32 which extends between the legs 12, 14 is relatively narrow but includes a widened central portion 32'. This widened central portion 32' of torsion spring 32 supports a combination balance arm and pointer. It will be understood that torsion spring 32 serves much the same function as the knife edges of prior art devices but without their disadvantages as set forth above. Adjustment of the spring's "stiffness" is effected by loosening one of set screws 28, 30 and rotating the corresponding post 24, 26 to tighten or loosen the spring. The set screw is then retightened.

The construction of the balance arm and pointer combination is best illustrated by FIGS. 4 and 7. It includes a substantially cylindrical tray support member 36 mounted against one surface of the central portion 32' of the torsion spring. The tray support member 36 includes a smaller diameter slotted end portion 38 which extends beyond the edge of bridge member 22. Mounted against the opposite surface of the central portion 32' of torsion spring 32 is a pointer support member 40. The tray support member and the pointer support member are held tightly together and clamped against the central portion 32' of torsion spring 32 by means of a threaded stud 42 which extends through a hole in the central portion 32'. The pointer support member 40 includes a small diameter portion 44 upon which is mounted a lower anvil 46 by means of downwardly depending legs 46′ and a pin 48 which extends through the legs and the small diameter portion 44. The end of the pointer support member is axially drilled and tapped to receive the threaded end of an elongated pointer 50. The pointer 50 extends the length of the base member 10 and terminates above the leg 20. It carries a counterweight 52 (FIGS. 1 and 2) which may be positioned along the pointer where desired by means of a set screw 54.

From FIG. 6 it will be noted that the leg 20 is flattened so as to support, by means of screws 56, an elongated vertical scale support member 58 which extends above the side plates 16, 18 and carries on its forwardmost surface a scale 60. Scale 60 carries a horizontal zero line 62 and is also graduated above and below the zero line as shown in FIG. 7. Mounted upon the upper edge of side plate 18 by means of a thumb screw 64 is a bracket 66 which holds a jeweler's loupe 68 focused on the zero line region of scale 60.

A positioning slot 70 is provided through the bridge member 22. Mounted over the slot 70 by means of an adjusting screw 72 is the base 74 of a micrometer height gauge 76. The height gauge 76 is a commercially available unit which need not be described in detail. Basically, it is in the form of a hollow cylindrical housing enclosing a vertical screw which is turned by a rotating cap 78. A driven member is engaged by the screw and includes a spring-stressing bracket arm 80 which extends through a vertical slot 82 in the side of the housing. Rotation of cap 78 thus raises and lowers the bracket arm 80. The bracket arm 80 is provided with an indexing plate 84 (FIG. 8) for indicating the vertical height against a scale 86 on the housing. For additional accuracy, the cap 78 is provided with a vernier scale 88 (FIGS. 2, 3).

In accordance with the present invention, two different spring-stressing means may be secured to the bracket arm 80. One of these means is illustrated in FIGS. 1–10, and the other in FIGS. 11–13. In the FIGS. 1–10 modification there is shown a hollow rectangular yoke 90 which fits over the bracket arm 80 and encloses a spacer block 92 for engaging the lower edge of the bracket arm. The yoke is held in place by means of a set screw 94. Depending from the bottom of yoke 90 is a swivel screw 96 having a head 96′. An L-shaped swivel 98 is loosely mounted by one leg on the swivel screw 96 and is retained by the head 96′. The other leg of the swivel is provided with a horizontally extending spring-engaging stud 100.

Loosely mounted within the slotted portion 38 of the tray support member 36 by means of a pivot pin 102 is a hanger bar 104. The upper end of the hanger bar carries a spring engaging stud 106 while the lower end is drilled to receive a wire yoke 108. Positioned to the yoke are two tray support wires 110, their four ends being secured to the upturned corners of a weight supporting tray 112.

The spring tester described herein is provided with a micrometer height gauge which extends from zero to two inches. It will be understood, however, that the invention in its broadest aspects is not limited to the testing of springs of any particular size. For initial adjustment of the apparatus, a standardizing link of one inch in length is first connected between studs 100 and 106. The cap 78 of the micrometer height gauge is then turned so as to raise the bracket arm 80 until exactly one inch is read on the micrometer scale. The set screw 54 of counterweight 52 is then loosened and the counterweight is moved to a position on the pointer 50 such that the pointer indicates the zero line 62 of scale 60 as observed through loupe 68. The standard link may then be removed and the device is ready for testing springs.

The modification of FIGS. 1–10 is designed primarily for the testing of tension coil springs and its use in such testing will now be described. The bracket arm 80 of the height gauge is lowered by rotation of cap 78 until the spring S to be tested easily hooks on to the studs 100, 106, as shown in FIG. 7. The height gauge is then adjusted until pointer 50 just reads zero and the lower loop on the spring just breaks away for stud 106. The micrometer then reads the free length of the spring. In FIG. 8, for example, the free length is shown as being approximately .65 inch.

The load specifications of a given spring are usually expressed in terms of weight and stretch length. In order to determine if the spring meets specifications, the height gauge is set to the required stretch length. In FIG. 10 this is shown as approximately .85 inch. This lifts the end portion 38 of tray support member 36 and depresses pointer 50 downscale from the zero mark, as shown by the broken lines of FIG. 9. The specified weight W is then placed in tray 112. This causes the spring to stretch as shown. Simultaneously, the torsion spring 32 is twisted about its horizontal axis and pointer 50 moves upscale toward the zero mark as shown. If the spring meets the required load tolerances, the pointer will come to rest on the zero mark. By using the load tester in this manner, production springs may be readily checked to see if they meet the specified tolerances. Any deviation will be indicated by the position of pointer 50.

As has been pointed out above, one of the objects of this invention is to provide a spring tester which may be used for testing compression springs as well as tension springs. The manner in which the tester is modified to accomplish this objective will now be described. The first step is to loosen the set screw 94 and remove yoke 90 from the bracket arm 80. The adjusting screw 72, which clamps the base 74 of the micrometer height gauge to the bridge member 22 is then loosened and the entire height gauge is then rotated 180° to the position illustrated in FIG. 11. The adjusting screw 72 is then tightened to reclamp the height gauge to the bridge member 22. A yoke 90′ is then secured to the bracket arm 80. This yoke and many of its component parts are similar to the yoke employed for testing tension springs and these parts are, therefore, given the same reference numerals with a prime attached. The basic difference, however, is that an upper anvil 114 having a shank 116 is secured to the bottom of the yoke 90′ by means of screw 118. The yoke is so positioned on the bracket arm 80 that the upper anvil 114 is directly above the lower anvil 46. In this manner, a compression spring S′ may be positioned between the anvils so that any weight which is placed upon the tray 112 will serve to compress the spring S′. This result occurs, of course, because the position occupied by the spring is on the opposite side of, and equidistant from, the fulcrum formed by the torsion spring 32 from the position occupied by the tension spring. Height readings of the spring free length and loaded lengths are made in substantially the same manner as previously described, although the readings will, of course, be reversed because the spring S′ will be shorter when stressed by a weight in tray 112.

It will also be noted that the illustrated load tester is provided with a horizontally extending support bar 120 which extends inwardly from the bridge member 22. Mounted upon this support bar by means of a set screw 122 is a spring support block 124 which is adjustably positionable along the support bar 120. Support block 124 is substantially L-shaped and the horizontal leg of the L is drilled to receive one leg of an L-shaped spring support pin 126. Pin 126 is adjustable relative to the support block and is held in position by means of a set screw 128. The function of the support pin 126 is to support the body of a torsion spring S″ (FIGS. 12, 13) so that its legs will engage the anvils 114 and 46. Thus springs of this nature may also be easily tested by the same apparatus.

It is believed that the many advantages of this invention will now be apparent to those skilled in the art. It will also be apparent that many variations and modifications may be made in this invention without departing from its spirit and scope. Accordingly, the foregoing description is to be construed as illustrative only, rather than limiting.

This invention is limited only by the scope of the following claims.

What we claim as new and desire to secure by Letters Patent of the United States is:

1. A spring tester which comprises: a base member; pivot means supported by said base member; a balance arm supported by said pivot means in a substantially stable position; indicating means arranged to indicate deviation of said balance arm from its stable position; selectively adjustable gauge means mounted on said base member; a first spring-stressing element mounted on said gauge means for movement therewith; a second spring-stressing element mounted on said balance arm for movement therewith and positioned at a first location spaced from said pivot means in a first direction; and a weight supporting tray suspended from said balance arm at a second location spaced from said pivot means in a second direction.

2. A spring tester which comprises: a base member; an elongated flat torsion spring supported by said base member; a balance arm supported by said torsion spring in a substantially stable position and extending therefrom in a first and a second direction; indicating means arranged to indicate deviations of said balance arm from its stable position; a first spring-stressing element mounted on said balance arm for movement therewith and positioned at a first location spaced from said torsion spring in said first direction; a second spring-stressing element mounted on said balance arm for movement therewith at a second location spaced from said torsion spring in said second direction; selectively adjustable gauge means mounted on said base member including a third spring-stressing element mounted on said gauge means for movement therewith, said gauge means being selectively positionable to align said third spring-stressing element with either of said first and second spring-stressing elements; and means for weighting said balance arm to stress a spring mounted between said third spring-stressing element and either of said first and second spring-stressing elements.

3. The spring tester of claim 2 wherein said means for weighting comprises a weight supporting tray suspended from said balance arm substantially at said first location.

References Cited

UNITED STATES PATENTS

| | | | |
|---|---|---|---|
| 339,947 | 4/1886 | Springer et al. | 177—196 |
| 340,006 | 4/1886 | Roeder | 177—196 |
| 340,008 | 4/1886 | Roeder | 177—196 |
| 1,894,442 | 1/1933 | Flanagan | 177—196 |
| 2,739,806 | 3/1956 | Stezer | 177—196 |
| 3,013,430 | 12/1961 | Boyden | 73—161 |

S. CLEMENT SWISHER, *Acting Primary Examiner.*

WILLIAM A. HENRY II, *Assistant Examiner.*